April 12, 1960   R. S. ARIES   2,932,323
POLYETHYLENE ARTICLES
Filed Feb. 25, 1957
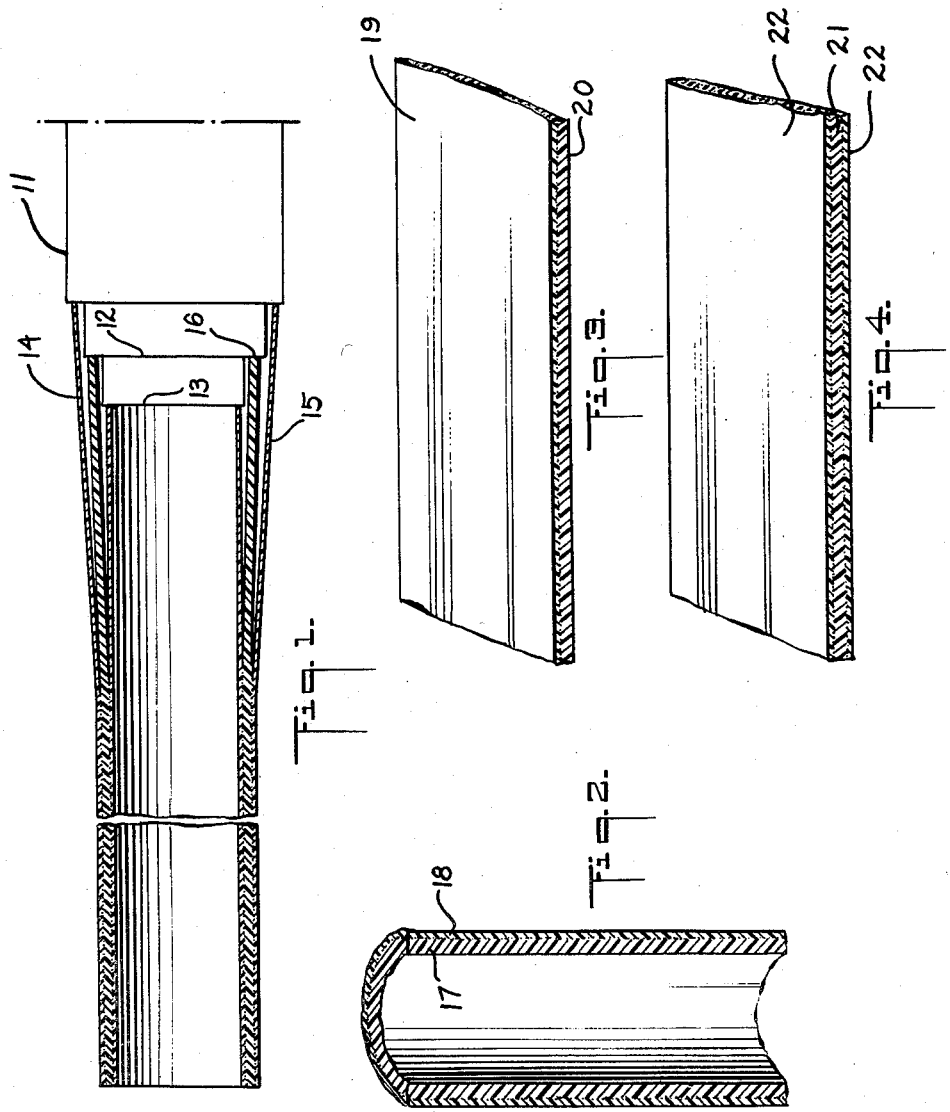
INVENTOR.
ROBERT S. ARIES
BY Leonard Horn
ATTORNEY

United States Patent Office 2,932,323
Patented Apr. 12, 1960

2,932,323

POLYETHYLENE ARTICLES

Robert S. Aries, New York, N.Y.,

Application February 25, 1957, Serial No. 641,944

8 Claims. (Cl. 138—55)

The present invention relates to the manufacture of a strong polyolefin article which is resistant to environmental stress cracking. More particularly it relates to the provision of sheets and tubes of polyolefins formed so as to combine the greater strength and rigidity of crystalline polyolefin structure with the environmental resistance of amorphous polyolefin structures.

Heretofore, tubing of amorphous polyethylene, i.e. lower melting and lower density polyethylene, has been prepared and found useful for conveying water and other liquids owing to its inert nature. Wider application of such tubing is limited however due to its flexibility, lack of stiffness and its lack of strength.

More recently, higher melting and higher density polyethylene has been prepared by various processes such as the so-called Ziegler process, the Phillips process and various other processes. These newer materials are more highly crystalline and accordingly have considerable strength and rigidity when fabricated into pipes, sheets and the like. When such stronger material has been used instead of the weaker, less crystalline polyethylene it has been found that after some time cracks tend to form, leading to failure and this phenomenon has been termed "environmental stress cracking."

It is accordingly an object of the present invention to provide polyolefin articles resistant to such environmental stress cracking but nonetheless of sufficient strength to be suited for widespread commercial application.

A further object of the invention is to provide several methods whereby the novel articles can be formed.

Through experimentation with and investigation of piping of high density polyethylene I have found that the cracking is due to contact of the atmosphere with the crystalline material, resulting presumably in the formation of active centers by reaction with atmospheric oxygen, light and possibly other causes. These centers spread or enlarge especially when the article is subject to stress, as in conveying a liquid or supporting a load, and eventually appear as a crack or cracks. In contrast therewith, the lower density polyethylene which is subject also to the same kind of attack and formation of active centers, because of its more irregular or random molecular structure distributes the stress more easily throughout its structure and is much less liable to develop such environmental stress cracking. Presumably the more highly crystalline structure of the stronger polyethylenes does not permit the distribution or taking up of the stresses which remain localized and result in cracks.

What has been stated above with respect to polyethylenes is equally true for the polypropylenes as articles formed from isotactic highly crystalline polypropylene tend to fail due to environmental stress cracking, while the atactic or molecularly randomly arranged polypropylenes have lower strength properties but are less subject to environmental stress cracking. Other crystalline or highly crystalline polyolefins show behavior analogous to that of the polyethylenes and polypropylenes indicated above.

In accordance with the present invention I have therefore provided a core of crystalline high density polyolefin protected by a layer of low density less crystalline polyolefin bonded thereto in such a manner that a unitary integral structure results. The core for certain articles can be in the form of rods or sheet material to provide the necessary strength, although the invention is especially adapted for use with small diameter tubing or with larger diameter tubing or piping. The protective layer can be provided on one or both sides of the crystalline sheet material or piping, depending on the access or absence of a specific environment, the atmosphere, for example.

The core material can be formed of any crystalline polyolefin such as polyethylene, polypropylene, polybutylene, and the like, such as is produced by the polymerization described in the Belgian and Australian patents to Ziegler, Phillips, etc. or in the U.S. patents, for example, assigned to the Standard Oil of Indiana and partially listed on pages 88 and 90 of Chemical Week, August 4, 1956, and others. The protecting layers can likewise be formed of any suitable polyolefin which has an amorphous or non-crystalline structure, such as the material produced, in the case of polyethylene, in accordance with the so-called ICI patents, of which British specification 471,590 to Fawcett et al. is an example.

Because of the chemical similarity of the various polyolefins the core and protective layer or layers can be formed of polymers from different olefin monomers, and the bond, created as hereinafter set forth will still be strong enough so that separation will not occur.

Separations which are known to occur rather easily in the case when distinctly different types of polymers are bonded, are believed in many cases to occur because of different rates of thermal expansion of the respective polymer components, are less likely to occur when the polymer components are more nearly alike in chemical composition, as in the case of the polyolefins generally, and are absent when the components are most nearly alike in chemical composition as, for instance, in the case of the various polyethylenes or the various polypropylenes, etc. The thermal expansion of polyethylene is quite high, the linear coefficient being $18 \times 10^{-5}/°$ C. at $0°$ C. and rising to $51 \times 10^{-5}/°$ C. at $110°$ C. This leads to separation when such polyethylene is bonded to other polymers of lower coefficients of thermal expansion, but is much less important for the different varieties of polyethylene.

Preferably the core and the protective layers are formed of crystalline and amorphous polyethylene respectively, or crystalline and amorphous polypropylene respectively.

The novel articles can be formed in a variety of ways. Molten masses of the core and protective materials can be simultaneously extruded from conventional equipment in the proper spatial arrangement so that upon cooling the novel articles will directly result.

Alternatively the inner layer may be preformed and the outer layer extruded so as to surround it with the minimum workable clearance so that upon cooling the outer protective layer will be shrink-fit over the inner layer. This method may be used to provide in two steps a core protected by outer and inner layers of the protective material. Furthermore, in this method after cold-shrinking the bonding may be assisted by applying pressure with the aid of an inner mandrel and external pressure rollers.

Or, alternatively the core of high density material can first be formed in conventional manner and can then be coated by dipping or spraying with the melted low density material or with a solution thereof. In still another process the crystalline core can be wrapped with a foil of low density material and subsequently the bonding can be achieved by heating with or without the application of pressure.

In cases where it is desired to create the firmest possible bonding the surfaces may be pretreated for this purpose, as, for instance, by subjecting them to treatment with sodium dissolved in liquid ammonia which activates the surfaces thus contacted. On subsequent washing and drying such surfaces they are found to be capable of better bonding and in certain cases mild warming below the melting point and application of suitable pressures will cause bonding.

In all cases the entrapment of air between the surfaces to be bonded should be carefully avoided, or kept to an absolute minimum.

Preferably, at least one of the contacting components is fluid, or at least softened by warming to nearly the melting point under the bonding conditions. Since the polyolefins are extremely poor conductors of heat, whenever one of the components is to be bonded as a solid it should be adequately conditioned so that the temperature is as close to the desired working temperature as is possible. This may be accomplished by storage of the sheet in a hot room at the appropriate temperature for a sufficiently long period, or in the case of pipe on a suitable mandrel supported so that the pipe is not subjected to pressure which would result in distortion.

When one of the components is applied as liquid there is no clear line of demarcation between the core and the protective surface. If both components are solid but pretreated to a suitably high temperature and are bonded by the application of adequate pressure there is also no clear line of demarcation. Consequently, there will be no tendency for separation of the core from the coating or covering layer as would otherwise take place if chemically dissimilar materials were involved.

The thickness of the covering can vary within wide limits and can be as small as 1/100 of an inch or less. The only requirement is that a layer at least several molecules thick at all points be formed to prevent contact between the core and the atmosphere. Ordinarily the coating is at least 1/32 of an inch thick to ensure that all of the underlying surface is covered and to compensate for any irregularities in the thickness of the coating.

The invention will now be described more fully with reference to the accompanying drawing, wherein:

Figure 1 is a schematic illustration of polyethylene tubing as extruded with a core of crystalline material covered on both surfaces with amorphous polyethylene;

Figure 2 is a vertical section through a length of crystalline polyethylene tubing covered on its outside with amorphous polyethylene;

Figure 3 is a perspective view of a sheet of crystalline polyethylene covered with a layer of amorphous polyethylene; and Figure 4 is a perspective view of a sheet of crystalline polyethylene having secured thereto on both surfaces layers of amorphous polyethylene.

Referring now more particularly to the drawing, in Figure 1 there are shown three concentric annular extrusion nozzles or orifices, 11, 12 and 13. Tubes of amorphous polyethylene 14, 15 are simultaneously extruded under heat and pressure through nozzles 11 and 13 and a tube of crystalline polyethylene 16 is extruded through nozzle 12. Because of the direction of discharge, the polyethylene streams abut each other and form a unitary mass, the layers becoming adhered to each other with a small amount of migration or diffusion so that there is no distinct line of demarcation between the amorphous and crystalline material.

In Figure 2 there is shown a tube of crystalline polyethylene 17 provided on its outside with a layer of amorphous polyethylene 18 such as might be produced by spraying.

A foil of amorphous polyethylene 19 is shown bonded to the top of a sheet of crystalline polyethylene 20 in Figure 3 while the sheet of Figure 4 comprises a core 21 of crystalline polyethylene with layers of amorphous polyethylene 22 secured thereto on both surfaces.

The following examples illustrate procedures whereby the novel articles may be formed:

*Example I*

A 2 foot length of commercial high melting crystalline polyethylene tubing one-half inch in internal diameter and 3/32 of an inch thick is dipped into a bath of low density, lower melting polyethylene maintained at a temperature of 180° C. Because of the somewhat higher melting point of the crystalline tubing, the cooling effect of the cold tube and the low rate of heat transfer, the surfaces of the tube soften only slightly, while the bath though viscous is still sufficiently fluid. After withdrawing the tubing and allowing it to cool, and cutting it transversely the wall thickness is found to be about 1/8 of an inch. No detectable lines of demarcation can be seen between the component materials. The product is identical in appearance with the tubing shown in Figure 1. A thinner coating can be applied by the use of a heated xylene solution of amorphous polyethylene, followed by suitable drying to remove volatiles, preferably in vacuum.

*Example II*

(a) A 1/8 inch thick sheet of high density polyethylene pre-warmed by storage at 85° C. for several hours (melting point 128° C.) is placed on the platen of a hydraulic press maintained at about 115° C. A foil of low density polyethylene 1/32 of an inch thick is placed on top of the high density material, 500 p.s.i. pressure is applied and held for two minutes. The sheet after being removed from the press and being cooled is 9/64 of an inch thick and cannot be delaminated. Such a product is shown in Figure 3.

(b) Isotactic polypropylene, prepared by solvent extraction of a partially crystalline polypropylene, is converted to a sheet. This sheet is prewarmed to 150° C. as in (a), and placed on a platen of a hydraulic press heated to 130° C. A sheet of partially crystalline polypropylene preheated to 150° C. is placed on this crystalline sheet and hydraulic pressure of 500 p.s.i. is applied for two minutes. After the sheet is removed from the press and cooled it cannot be delaminated. Such a product is shown in Figure 3.

*Example III*

A particularly strong and resistant tubing can be formed as shown in Figure 1 by the use of an extruder provided with three concentric annular extrusion orifices with the inner walls of the second and third orifices being formed by the outer walls of the first and second orifices, respectively. The innermost and outermost orifices are 1/16 of an inch wide while the median orifice is 1/8 of an inch wide, the innermost orifice having an internal diameter of one inch. Amorphous polyethylene is fed to the innermost and outermost orifices while crystalline polyethylene is fed to the median orifice and extrusion through all orifices is effected simultaneously. The temperature of the discharged material is sufficient to cause adhesion between the effluent masses with a small amount of migration sufficient to form a bonded tubing which cannot be delaminated or peeled.

Various changes and modifications may be made without departing from the spirit and scope of the present invention and it is intended to embrace such changes and modifications by the annexed claims.

What I claim is:

1. A strong polyolefin article resistant to environmental stress cracking comprising a base of crystalline polyolefin and a layer of amorphous polyolefin integrally bonded to said base, said amorphous layer preventing access to the underlying crystalline base.

2. A polyolefin article as defined in claim 1, wherein the polyolefins are polypropylene.

3. A polyolefin article as defined in claim 1, wherein said base comprises a sheet of crystalline polyolefin protected on at least one surface with said layer of amorphous polyolefin.

4. A polyolefin article as defined in claim 2, wherein both surfaces of said sheet are protected with layers of amorphous polyolefin.

5. A polyolefin article as defined in claim 1, wherein said base comprises a tubular body of crystalline polyolefin protected on at least one surface with said layer of amorphous polyolefin.

6. A polyolefin article as defined in claim 4, wherein both surfaces of said tubular body are protected with layers of amorphous polyolefin.

7. As a new article of manufacture, strong polyethylene tubing which is resistant to environmental stress cracking, comprising a tubular body of crystalline polyethylene, and a layer of amorphous polyethylene integrally bonded to said tubular body on at least one surface thereof, said amorphous layer preventing access to the underlying tubular body.

8. Polyethylene tubing as defined in claim 6, wherein the amorphous polyethylene is bonded to said tubular body on both surfaces thereof.

References Cited in the file of this patent

UNITED STATES PATENTS

| | | |
|---|---|---|
| 2,336,384 | Baker et al. | Dec. 7, 1943 |
| 2,383,733 | Parker | Aug. 28, 1945 |
| 2,384,224 | Williams | Sept. 4, 1945 |
| 2,471,752 | Ingmanson | May 31, 1949 |
| 2,498,653 | Daly | Feb. 28, 1950 |
| 2,632,921 | Kreidl | Mar. 31, 1953 |
| 2,645,249 | Davis et al. | July 14, 1953 |
| 2,710,987 | Sherman | June 21, 1955 |
| 2,747,616 | Ganahl | May 29, 1956 |
| 2,774,109 | Kaufman | Dec. 18, 1956 |

OTHER REFERENCES

"Photocatalysed Oxidation of Polythene," J. Soc. Chem. Ind., vol. 69, April 1950, pp. 113–116. (Copy in Div. 25.)

Notice of Adverse Decision in Interference

In Interference No. 91,952 involving Patent No. 2,932,323, R. S. Aries, Polyethylene articles, final judgment adverse to the patentee was rendered Dec. 6, 1962, as to claim 2.

[*Official Gazette February 5, 1963.*]